(12) United States Patent
Forsgren

(10) Patent No.: US 8,170,603 B2
(45) Date of Patent: May 1, 2012

(54) DIFFERENTIATED ACCESS TO A DATA ITEM STORE

(75) Inventor: Rolf Gunnar Forsgren, Värmdö (SE)

(73) Assignee: Sony Ericsson Mobile Communications AB, Lund (SE)

(*) Notice: Subject to any disclaimer, the term of this patent is extended or adjusted under 35 U.S.C. 154(b) by 305 days.

(21) Appl. No.: 11/555,909

(22) Filed: Nov. 2, 2006

(65) Prior Publication Data

US 2008/0051079 A1    Feb. 28, 2008

Related U.S. Application Data

(60) Provisional application No. 60/823,689, filed on Aug. 28, 2006.

(51) Int. Cl.
*H04M 1/00*    (2006.01)

(52) U.S. Cl. ..................... 455/550.1; 709/213

(58) Field of Classification Search .................. 455/410, 455/411, 557, 558, 418, 419
See application file for complete search history.

(56) References Cited

U.S. PATENT DOCUMENTS

| | | | |
|---|---|---|---|
| 6,463,300 B1* | 10/2002 | Oshima | 455/558 |
| 6,808,396 B2* | 10/2004 | Kawaguchi et al. | 439/76.1 |
| 7,706,777 B2* | 4/2010 | Karaoguz et al. | 455/411 |
| 2002/0052214 A1* | 5/2002 | Maggenti et al. | 455/517 |
| 2005/0101309 A1* | 5/2005 | Croome | 455/418 |
| 2005/0107114 A1* | 5/2005 | Ocock | 455/550.1 |
| 2005/0176465 A1* | 8/2005 | Fornell | 455/558 |
| 2006/0063565 A1* | 3/2006 | Ueno | 455/558 |
| 2006/0105745 A1 | 5/2006 | Frank | |

FOREIGN PATENT DOCUMENTS

| | | |
|---|---|---|
| EP | 1 107 627 A1 | 6/2001 |
| EP | 1 367 843 A1 | 12/2003 |

* cited by examiner

*Primary Examiner* — Dwayne Bost
*Assistant Examiner* — Joseph Dean, Jr.
(74) *Attorney, Agent, or Firm* — Harrity & Harrity, LLP

(57) ABSTRACT

A portable electronic device includes an interface unit for connection to a removable storage medium; at least one data item store; a group of application handling units, at least one application handling unit in the group of application handling units providing an application handling user data; at least one access control module; and an access setup unit configured to receive a user identity from the removable storage medium via the interface unit, locate a user access control module associated with the received user identity, and force user data handling applications that view, read, or write data items to access data item stores in the portable electronic device via the user access control module. The user access control module restricts viewing, reading, and writing of data items to data areas provided for the user identity in data item stores in the portable electronic device.

21 Claims, 2 Drawing Sheets

DIFFERENTIATED ACCESS TO A DATA ITEM STORE

RELATED APPLICATION

This application claims priority under 35 U.S.C. §119 based on U.S. Provisional Application Ser. No. 60/823,689, filed Aug. 28, 2006, the disclosure of which is incorporated herein by reference.

FIELD OF THE INVENTION

Implementations consistent with principles of the invention relate to individual user security in the field of portable electronic devices and, more particularly, to a system, method, and computer program product for providing differentiated access to a data item store in a portable electronic device, as well as to such portable electronic devices.

BACKGROUND OF THE INVENTION

Portable electronic devices, such as cellular phones, are becoming more and more popular and include more and more functionalities and functions. It is, for instance, possible to use portable electronic devices as calendars to keep track of meetings, as music machines for playing music, as well as cameras and video playing devices. Because of this, the economical value of content stored on a device may be significant. Such content generated by a user and stored in the portable electronic device may also be sensitive, in that it includes information that is private and not to be shared.

Because of the small size of these devices, they are easy to lose, for instance, because of accidental dropping or theft. It may, therefore, be important that the content is not shared with anyone other than the user creating it. Portable communication devices may also be shared by several persons or temporarily borrowed by other persons. When this happens, it may be important that the content stored on the portable communication devices is not shared or is only shared in a controlled manner. If a portable communication device is lost, it may be protected against access if the original user had activated a certain type of password.

SUMMARY OF THE INVENTION

According to a first aspect of the invention, a method includes receiving a removable storage medium in a portable electronic device; receiving a user identity from the removable storage medium; identifying a user access control module associated with the received user identity; and forcing user data handling applications that view, read, or write data items to access data item stores in the portable electronic device via the user access control module.

Additionally, the method includes determining if a user access control module exists for the received user identity; and creating a new user access control module when a user access control module does not exist for the received user identity.

Additionally, each user access control module has an own identity, the identifying a user access control module includes identifying a single access control module identity corresponding to the received user identity, and the forcing includes setting each data accessing application to access all data item stores via an access control module associated with the single control module identity.

Additionally, the user identity is specific for the removable storage medium.

Additionally, the user identity is common to a set of removable storage mediums allowing access to the data items of the user identity for all storage mediums within the set.

Additionally, the user identity includes a user identity that is common to a set of removable storage mediums, where each removable storage medium within the set has an own individual user identity, where the access control modules of the individual user identities have access to data items that are associated with the common user identity and provided in at least one data area common to the set of user identities.

According to a second aspect, a portable electronic device includes an interface unit for connection to a removable storage medium; at least one data item store; a group of application handling units, at least one application handling unit in the group of application handling units providing an application handling user data; at least one access control module; and an access setup unit configured to receive a user identity from the removable storage medium via the interface unit, locate a user access control module associated with the received user identity, and force user data handling applications that view, read, or write data items to access data item stores in the portable electronic device via the user access control module, the user access control module restricting viewing, reading, and writing of data items to data areas provided for the user identity in data item stores in the portable electronic device.

Additionally, the access setup unit is further configured to determine if a user access control module exists for the received user identity, and create a new user access control module when a user access control module does not exist for the received user identity.

Additionally, the portable electronic device comprises a plurality of user access control module, each user access control module is associated with a unique identity, and where the access setup unit is further configured to locate a single access control module identity corresponding to the received user identity, and set each data accessing application to access all data item stores via an access control module associated with the single control module identity.

Additionally, the user identity is unique to the removable storage medium.

Additionally, the user identity is common to a set of removable storage mediums allowing access to the data items of the user identity for all storage mediums within the set.

Additionally, the user identity is common to a set of removable storage mediums, where each removable storage medium within the set is associated with a unique user identity and each access control module associated with an individual user identity has access to data items that are associated with the common user identity and provided in at least one data area common to the set of user identities.

Additionally, the portable electronic device includes a portable communication device.

Additionally, the portable electronic device includes a cellular phone.

Additionally, the removable storage medium includes a subscriber identity module.

According to a third aspect, a portable electronic device includes means for receiving a removable storage medium in the portable electronic device; means for receiving a user identity from the removable storage medium; means for identifying a user access control module associated with the received user identity; and means for forcing user data handling applications that view, read, or write data items to access data item stores in the portable electronic device via the identified user access control module.

According to a fourth aspect, a computer program product, for providing differentiated access to a data item store in a portable electronic device including computer program code, to make the electronic communication device perform, when the program is loaded in the portable electronic device, a method including receiving a user identity from a removable storage medium; locating a user access control module associated with the received user identity; and forcing user data handling applications that view, read, or write data items to access data item stores in the device via the user access control module, the user access control module restricting viewing, reading, and writing of data items to data areas provided for the user identity in data item stores of the portable electronic device.

BRIEF DESCRIPTION OF THE DRAWINGS

The present invention will now be described in more detail in relation to the enclosed drawings, in which.

DETAILED DESCRIPTION OF PREFERRED EMBODIMENTS

Implementations consistent with the invention are directed toward enhancing the security of user data items stored in a portable electronic device.

A portable electronic communication device according to an implementation consistent with principles of the invention is described in relation to a cellular phone 10. The portable electronic device is not limited to cellular phones, but it may, for instance, include a palm top computer, an electronic organizer, a music player, a video recording/playing device, a gaming machine, and/or other types of devices in other implementations consistent with principles of the invention.

Figure 1:
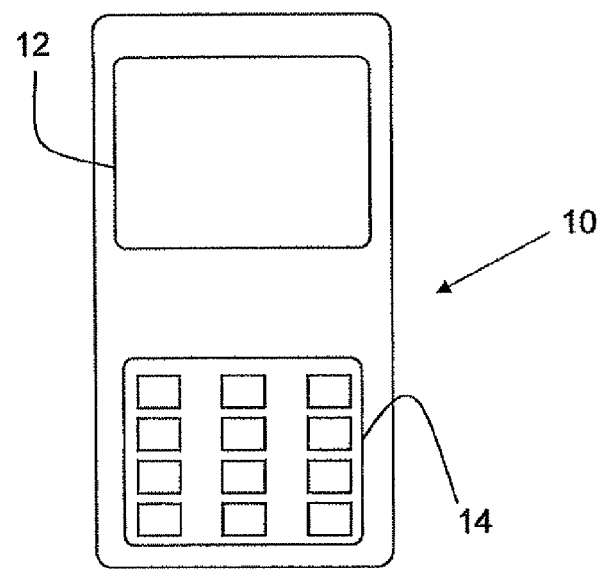
FIG. 1 shows an exemplary front view of a portable electronic device according to an implementation consistent with principles of the invention.

FIG. 1 shows an exemplary front view of cellular phone 10 having a display 12 and a user input unit in the form of a keypad 14 including a number of keys. Keypad 14 may be used for entering information, such as selecting of functions and responding to prompts, and display 12 may be used for displaying functions and prompts to a user of phone 10, as well as for presenting information, such as different data items like video, calendar settings, phone book entries, etc. Phone 10 may also include a speaker (not shown) arranged to emit sound, like speech or music being played in phone 10.

Figure 2:
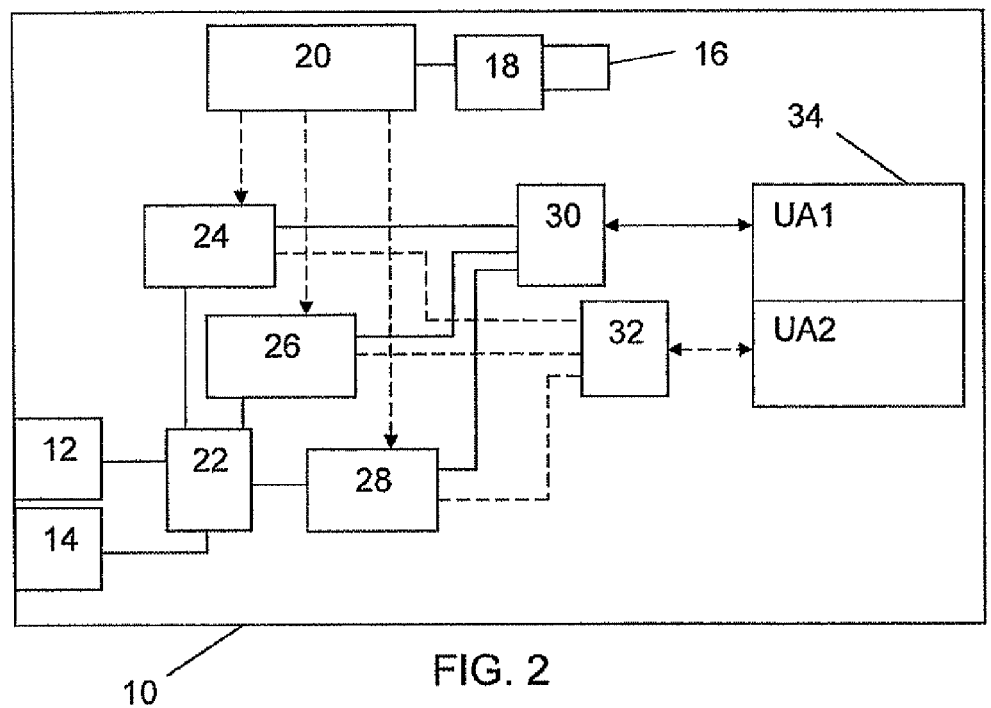
FIG. 2 shows an exemplary block schematic of a portion of the portable electronic device of FIG. 1, where a removable storage medium is connected to an interface of this device, FIG. 3 schematically shows an exemplary flow chart for providing differentiated access to a data item store according to an implementation consistent with principles of the invention, and FIG. 4 schematically shows a computer program product according to an implementation consistent with the principles of the invention in the form of a CD Rom disc.

FIG. 2 shows an exemplary block schematic of a portion of cellular phone 10. As illustrated, phone 10 may include an interface 18 to a removable storage medium, which may be in the form of a removable storage medium reader, such as a SIM (Subscriber Identity Module) card reader. A removable storage medium 16, such as a SIM card, may be received or connected to interface 18. Interface 18 is in turn connected to an access setup unit 20 which in turn controls, as is indicated with dashed arrows, a first, second and third application handling unit 24, 26 and 28. The number of application handling units illustrated in FIG. 2 is exemplary. In other implementations, more or fewer application handling units may be provided in other implementations consistent with principles of the invention. Each application handling unit 24, 26 and 28 may handle an application, such as a calendar, phone book, music player, browser, music player, camera/video player, etc. The applications may include applications that handle user data (e.g., applications that can read, write, and view user data). Application handling units 24, 26, 28 may connect to a user interface control unit 22, which in turn may connect to display 12 and keypad 14, in order for a user of device 10 to be able to select different applications and provide and receive inputs to/from these different applications. Phone 10 may further include a first and a second user access control module 30, 32 to which each application handling unit 24, 26 and 28 can be connected. In FIG. 1, application handling units 24, 26 and 28 may connect to first access control module 30, which is shown with solid lines, with the possibility to get connected to the second access control module 32 (as shown with dashed lines). Each access control module 30 and 32 may control a part of a data item store 34, where first access control module 30 controls a first user data area UA1 and the second access control module 32 controls a second user data area UA2. A user access control module may ensure that all operations involving accessing, viewing, and/or reading from and writing to the data item store 34 is restricted or only made to the user area controlled by it. In one implementation consistent with principles of the invention, accessing, viewing, and/or reading from or writing to any other user data area controlled by other user access control modules may not be permitted. The significance of this will be described in more detail shortly. It should here be realized that the number of access control modules can be greater than two. However, two are shown in FIG. 2 in order to more easily describe the invention The different applications handled by application handling units 24, 26 and 28 may be equipped with a process identifier, which may, in case the device uses an operating system like Symbian, be denoted UID (Unique Identifier). These identifiers are used for the different processes of the device to call on each other. Also, the access control functions provided by the access control modules may have such process identifiers, which are also called access module identities. The access setup unit 20 keeps a table of user identities associated with storage mediums with a mapping to corresponding access module identities 30 and 32.

A user access control module according to an implementation consistent with principles of the invention may include a module having such an identity and is designed to only access a certain part or area of the data item store. Thus, the user access control module may act as a filter that puts limitations on the parts of the store that can be accessed by a user.

Figure 3:
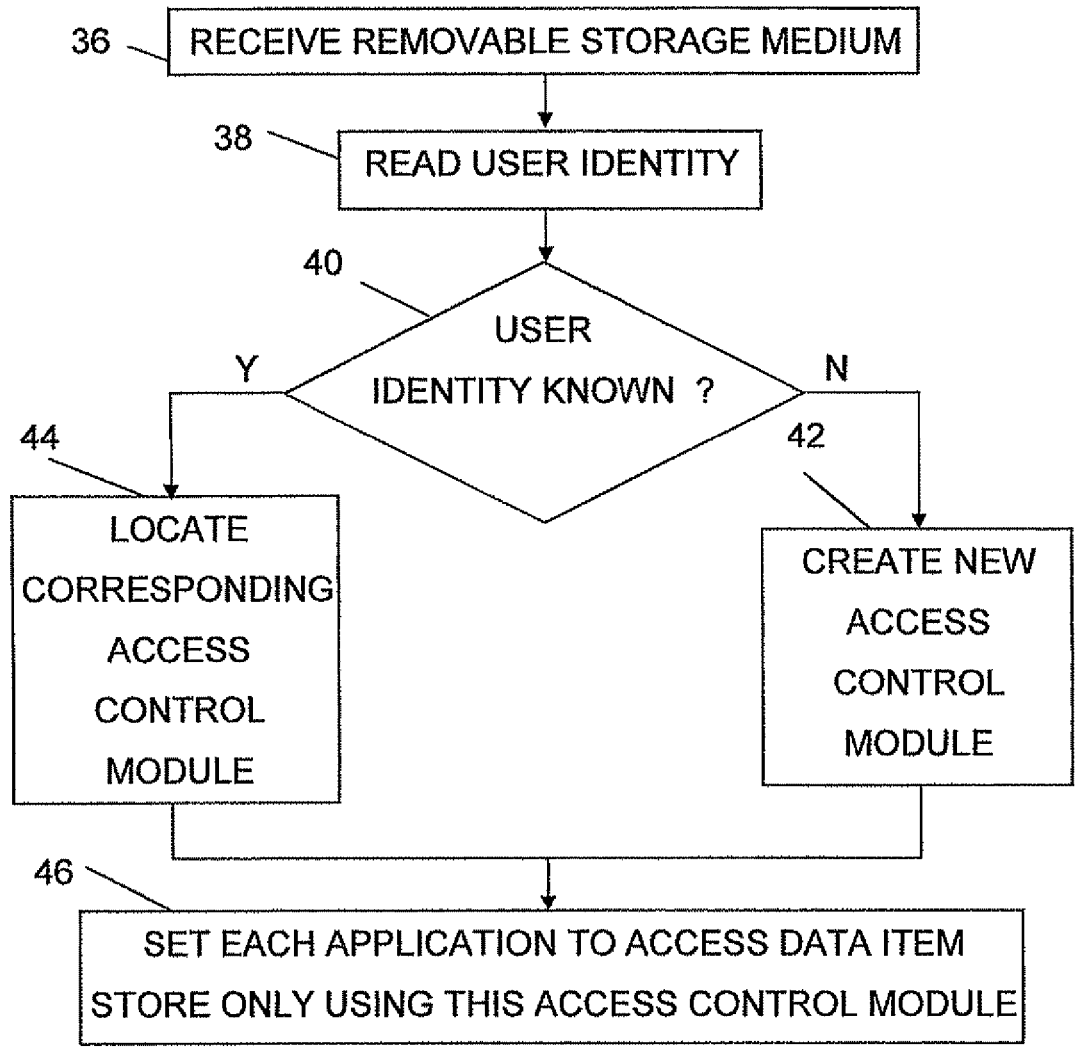

Exemplary functioning consistent with principle of the invention will now be described with reference to FIGS. 2 and 3, where the latter shows an exemplary flow chart for providing differentiated access to a data item store.

According to one implementation consistent with principles of the invention, a removable storage medium 16, which may include a SIM card, is provided with a user identity that is specific to the actual user. This may be the same as the identity of the card or may be a separate user identity stored on the card. Storage medium 16 may be received by interface 18 (block 36). This may be detected by access setup unit 20, which may then read the user identity via interface 18 (block 38). This act may be combined with an authorization of the user. Access setup unit 20 may investigate if the user identity is known (block 40) (e.g., if there is an entry in the table that contains the user identity).

If no such user identity exists in the table for storage medium 16, a new user access control module with a new control module identity may be created (block 42), and the new user identity and control module identity may be stored in the table. If, however, the user identity exists in the table (block 40), the corresponding access control module may be identified by, for example, fetching a single control module identity corresponding to the user identity from the table (block 44).

Thereafter, in both cases, each application in the different application handling units 24, 26, 28 may be set, by access setup unit 20, to access data in data item store 34 only via the access control module that has been identified or created (block 46). In this way, applications run by the application handling units 24, 26 and 28 are forced to perform accessing of data item store 34 via this specific user access control module. This may be performed by setting all the application handling units 24, 26, and 28 to call on the selected access control module using the control module identity of this module each time any operation requiring the access of data item store 34 is needed. This is exemplified in FIG. 2 in that the first access control module 30 has been set as being provided for a user identity of storage medium 16, as indicated with solid lines, while the second access control module 32, which is associated with the user identity of another portable storage medium, is set as inactive, as is indicated with dashed lines.

Thus, when a user starts an application, which gets invoked by user interface control unit 22 as a response to user inputs via keypad 14, and then tries to store, view, and/or retrieve data items in data item store 34, the application will only access the data area UA1 associated with first access control module 30 when trying to access the data item storage. In this way, other user areas will not be seen and may not be written to or read from by the user. Thus, data items of a specific user may be stored in the user area of the data item store that is associated with the user identity of this user.

The creation of an access control module may be performed by selecting a non-used memory area as a suitable user area, and providing a function, with a control module identity, that when called by an application using this control module identity, only selects this area whenever access of the data item store is to be performed.

Thus, it is possible to separate the data item store for different user identities and, therefore, for different users when the phone is not blocked, without a user being able to find out that other items than the ones belonging to him/her exist. This also has the positive effect that the data items that may have a certain economical value, for instance, music and/or video files, cannot be accessed by other persons than this particular user. The motivation to steal the portable electronic device is, therefore, lowered. Enhanced safety for sensitive user data, such as secret meeting appointments and other data that might be sensitive to share with others, may be provided, since another user will not be aware that the data in question exists. This is, furthermore, accomplished without the need to use encryption, although it should be realized that implementations consistent with principles of the invention may very well be combined with encryption in order to further enhance security. Implementations consistent with principles of the invention do not, in many cases, need any further user authentication, such as additional password, pass phrase, pin code, and/or other security measures, to be used, since it may involve a removable storage medium, like a SIM card, already having such a measure. Thus, a user does not need to remember any additional code than the one he/she is already using when turning on a phone.

The user identity may be specific for one removable storage medium as described above. According to one variation of the invention, a user may instead have several or a set of removable storage mediums, where each is provided with the same user identity. Thus, the user identity may be common to the set of removable storage mediums and allows access to the data items of the user identity for all these storage mediums within the set. These storage mediums may then be used for accessing the same user area. This variation is advantageous if a user has more than one storage medium (for instance, a spare medium in case one is lost). It is also possible that these storage mediums are provided for different contexts, one being that one is associated with a certain subscription in a network, like the subscription of an employer, and the other with another subscription, like the personal subscription of the user.

According to another variation, it is possible that the user identity includes a user identity that is common to a number of removable storage mediums, where each such removable storage medium has an own individual user identity. In this case, the access control modules associated with the different individual user identities have access to a data area comprising data items associated with the common user identity. This may be provided through the provision of unique user identities that comprise a part that is common to a set of user identities and this common part may be used to identify a common area of the data item store. The different access control units may have access to this common area. This may be of interest if, for instance, the different users belong to the same group that may be a department, family, or company. In this area, data items that are of interest to all members of the group may then be provided and all can view/access it. This may be of interest if the device is, for instance, an extra phone used in a company or perhaps a department of a company and to be used as a spare when the ordinary phone of a user has been stolen or is in repair. This may, for instance, enable the storing of contact information that is of interest for the whole group (e.g., the phone numbers of computer support, and other common data items, like common calendar settings like department meetings).

As an example, a user identity may look like: 123456, where the numbers 123 may represent the common part of the user identity and either the whole number 123456 or only the last part 456 may represent the unique user identity.

The access setup unit, the user interface control unit, the application handling units, and access control modules may be provided through one or more processors with associated program memories, which perform the various functions of these entities. The data item store may be provided as a normal memory, such as a read only memory (ROM), a random access memory (RAM), or flash memory. These different units may furthermore communicate with each other using a data bus.

Figure 4:
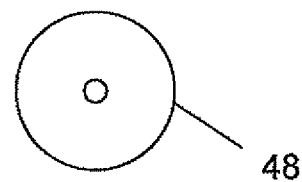

The program code for performing the processing described above can also be provided as a computer program product on one or more data carriers, which performs implementations consistent with the principles of the invention when loaded into the phone or the content providing device, of which one type, a CD ROM disc 48, is shown in FIG. 4. This is just an example of one such data carrier. Other types are just as well feasible like, for instance, memory sticks. The program code might furthermore also be downloaded into the phone from an external server.

CONCLUSION

Implementations consistent with the invention are directed toward enhancing the security of user data items stored in a portable electronic device.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts were described above with respect to FIG. 3, the order of the acts may be different in other implementations consistent with principles of the invention. Moreover, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method comprising:
   receiving a removable storage medium in a portable electronic device;
   receiving a user identity from the removable storage medium;
   determining if a user access control module exists for the received user identity;
   creating a new user access control module when a user access control module does not exist for the received user identity;
   identifying a user access control module associated with the received user identity; and
   forcing all user data handling applications that view, read, or write data items to access data item stores in the portable electronic device via the user access control module or the new access control module,
   whereby a user cannot access another user's data, that is stored in the portable electronic device, and cannot even learn of an existence of another user's data, that is stored in the portable electronic device.

2. The method according to claim 1, where each user access control module has an own identity,
   where the identifying a user access control module comprises:
      identifying a single access control module identity corresponding to the received user identity, and
   where the forcing comprises:
      setting each data accessing application to access data item stores via an access control module associated with the single control module identity.

3. The method according to claim 1, where the user identity is specific for the removable storage medium.

4. The method according to claim 1, where the user identity is common to a set of removable storage mediums allowing access to the data items of the user identity for all storage mediums within the set.

5. The method according to claim 1, where the user identity includes a user identity that is common to a set of removable storage mediums, where each removable storage medium within the set has an own individual user identity, where the access control modules of the individual user identities have access to data items that are associated with the common user identity and provided in at least one data area common to the set of user identities.

6. A portable electronic device comprising:
   an interface unit for connection to a removable storage medium;
   at least one data item store;
   a group of application handling units, at least one application handling unit in the group of application handling units providing an application handling user data;
   at least one access control module; and
   an access setup unit to:
      receive a user identity from the removable storage medium via the interface unit,
      determine if a user access control module exists for the received user identity,
      create a new user access control module when a user access control module does not exist for the received user identity,
      locate a user access control module associated with the received user identity, and
      force user data handling applications that view, read, or write data items to access data item stores in the portable electronic device via the user access control module or the new user access control module, the user access control module restricting viewing, reading, and writing of data items to data areas provided for the user identity in data item stores in the portable electronic device,
   whereby a user cannot access another user's data, that is stored in the portable electronic device, and cannot even learn of an existence of another user's data, that is stored in the portable electronic device.

7. The portable electronic device according to claim 6, where the portable electronic device comprises a plurality of user access control modules, each user access control module is associated with a unique identity, and
   where the access setup unit is further to:
      locate a single access control module identity corresponding to the received user identity, and
      set each data accessing application to access data item stores via an access control module associated with the single control module identity.

8. The portable electronic device according to claim 6, where the user identity is unique to the removable storage medium.

9. The portable electronic device according to claim 6, where the user identity is common to a set of removable storage mediums allowing access to the data items of the user identity for all storage mediums within the set.

10. The portable electronic device according to claim 6, where the user identity is common to a set of removable storage mediums, where each removable storage medium within the set is associated with a unique user identity and each access control module associated with an individual user identity has access to data items that are associated with the common user identity and provided in at least one data area common to the set of user identities.

11. The portable electronic device according to claim 6, where the portable electronic device includes a portable communication device.

12. The portable electronic device according to claim 11, where the portable electronic device includes a cellular phone.

13. The portable electronic device according to claim 12, where the removable storage medium includes a subscriber identity module.

14. A portable electronic device comprising:
   means for receiving a removable storage medium in the portable electronic device;
   means for receiving a user identity from the removable storage medium;
   means for determining if a user access control module exists for the received user identity;
   means for creating a new user access control module when a user access control module does not exist for the received user identity;
   means for identifying a user access control module associated with the received user identity; and
   means for forcing user data handling applications that view, read, or write data items to access data item stores in the portable electronic device via the identified user access control module or the new user access control module,
   whereby a user cannot access another user's data, that is stored in the portable electronic device, and cannot even learn of an existence of another user's data, that is stored in the portable electronic device.

15. A tangibly-embodied computer program product, for providing differentiated access to a data item store in a portable electronic device comprising computer program code, to make the electronic communication device perform, when the program is loaded in the portable electronic device, a method comprising:
   receiving a user identity from a removable storage medium;
   determining if a user access control module exists for the received user identity;
   creating a new user access control module when a user access control module does not exist for the received user identity;
   locating a user access control module associated with the received user identity; and
   forcing user data handling applications that view, read, or write data items to access data item stores in the device via the user access control module or the new user access control module,
   where the user access control module restricts viewing, reading, and writing of data items to data areas provided for the user identity in data item stores of the portable electronic device,
   whereby a user cannot access another user's data, that is stored in the portable electronic device, and cannot even learn of an existence of another user's data, that is stored in the portable electronic device.

16. A method comprising:
   storing, in a data store of a portable electronic device, a first set of data associated with a particular user and a second set of data not associated with the particular user;
   receiving a removable storage medium at the portable electronic device;
   determining, at the portable electronic device, that the removable storage medium is associated with the particular user; and
   providing, to the particular user, access to the first set of data, but not the second set of data, via a plurality of application programs of the portable electronic device,
   whereby the particular user cannot access another user's data, that is stored in the portable electronic device, and cannot even learn of an existence of another user's data, that is stored in the portable electronic device.

17. The method of claim 16, where the particular user is a first user, where the second set of data is associated with a second user, where the method further comprises:
   receiving another removable storage medium at the portable electronic device;
   determining, at the portable electronic device, that the other removable storage medium is associated with the second user; and
   providing, to the second user, access to the second set of data, but not the first set of data, via the plurality of application programs of the portable electronic device.

18. The method of claim 16, where the first and second sets of data each include at least one of video, calendar settings, or phone book entries.

19. The method of claim 16, where the plurality of application programs includes at least one of a calendar, a phone book, a music player, a video player, a browser, or a camera.

20. The method of claim 16, where providing access to the first set of data comprises not allowing the particular user to be aware of data in the data store that is not associated with the particular user.

21. The method of claim 16, further comprising:
   determining if a user access control module exists for the particular user; and
   creating a new user access control module when a user access control module does not exist for the particular user.

* * * * *